United States Patent Office 2,871,093
Patented Jan. 27, 1959

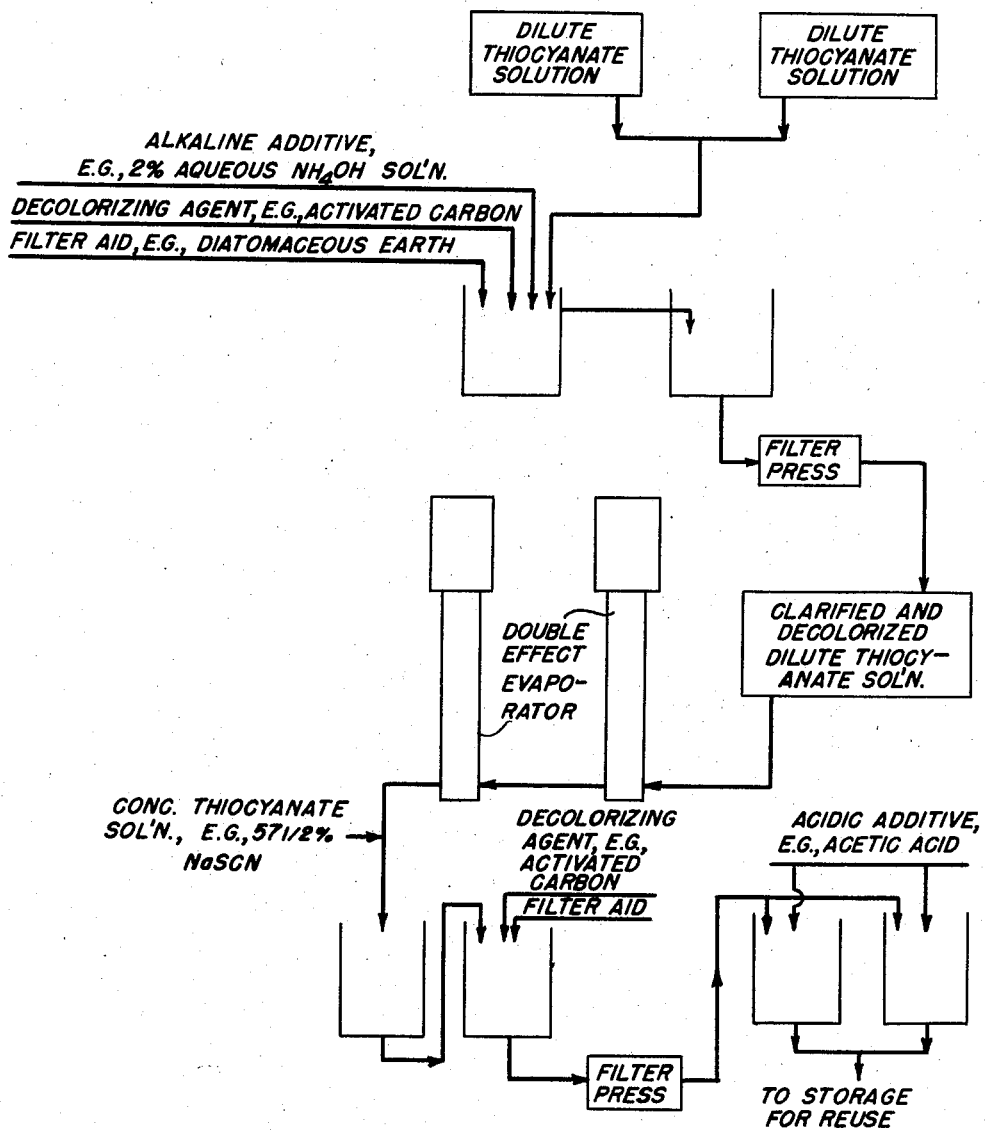

2,871,093

METHOD OF RECOVERING THIOCYANATE SOLUTIONS

Thomas R. Blanchard, Waterbury, Conn., assignor to American Cyanamid Company, New York, N. Y., a corporation of Maine Application August 25, 1955, Serial No. 530,535

15 Claims. (Cl. 23—75)

This invention relates to a method of obtaining or recovering valuable and useful thiocyanate solutions from thiocyanate solutions that otherwise would be waste products because of lack of economic commercial utility. More particularly, the invention is concerned with a new and improved method of obtaining a concentrated aqueous solution (i. e., a solution containing a solvent comprising water) of a water-soluble thiocyanate, (for instance, sodium thiocyanate, potassium thiocyanate or other alkali-metal thiocyanate) from a dilute solution thereof, specifically an acidic dilute solution of a water-soluble thiocyanate; that is, such a solution having a pH of less than 7.0, e. g., from 4 or 5 to 6.9. Still more particularly, the invention relates to the obtainment of a valuable and useful product from a by-product from the manufacture of certain synthetic fibers, more particularly fibers comprised of a polymer of acrylonitrile and which have been produced by a particular method.

One of the methods by which polyacrylonitrile fibers can be produced involves the use of a spinning solution comprising a polymer (homopolymer or copolymer) of acrylonitrile dissolved in a concentrated aqueous solution of a water-soluble salt which yields highly hydrated ions in an aqueous solution. Such salts, which are primarily hydrated salts, include the thiocyanates, chlorides, bromides, iodides, perchlorates and nitrates. (For additional information on these salts and uses of concentrated aqueous solutions thereof see, for example, Rein U. S. Patent No. 2,140,921, dated December 20, 1938.) Other patents describing the use of thiocyanate and other such salt solutions in making fibers from a polymer of acrylonitrile include, for example: Cresswell U. S. Patent No. 2,533,224, dated December 12, 1950, and which discloses the use of aqueous or alcoholic solutions of guanidine thiocyanate and of certain other substituted thiocyanates as a solvent for a polymer of acrylonitrile, and the use of such solutions in making fibers and other shaped articles therefrom; Cresswell U. S. Patents 2,558,730, -1, -2, -4 and -5, all dated July 3, 1951; Cresswell and Wizon U. S. Patent No. 2,558,733 and Pollard U. S. Patent No. 2,558,781, each dated July 3, 1951; and, for instance, British Patents 714,530; 715,915; 729,472 and 732,135. Some of these patents, e. g., British Patent 714,530, disclose solvent mixtures for acrylonitrile polymers which contain, in addition to water and a water-soluble thiocyanate or other salt of the kind described above and in the aforementioned patents, also one or more water-miscible aliphatic liquids containing not more than six carbon atoms and one alcoholic hydroxyl group in the molecule; and also disclose shaped articles, specifically fibers, made from a solution containing a polymer of acrylonitrile dissolved in such a solvent mixture.

In the production of staple fibers, continuous filaments (mono- and multifilaments), rods, tubes, films, ribbons, sheets and other shaped articles from a solution of a polymer of acrylonitrile dissolved in a concentrated aqueous solution of a water-soluble thiocyanate (with or without one or more other additives such as a lower monohydric alcohol), dilute solutions of the thiocyanate are obtained. It is important to the economics of the process that such dilute solutions be concentrated and the concentrated thiocyanate solution then reused in the process. Otherwise the manufacturing costs may be prohibitive from a competitive standpoint.

At first glance it might appear that no recovery problem would be encountered. Actually, such a problem was encountered, one aspect of which comprised the very serious matter of decomposition of the thiocyanate, specifically sodium thiocyanate, and the accompanying formation of hydrogen sulfide during concentration of the dilute solution as by, for example, evaporation under heat. Another closely related problem was that of obviating or minimizing such thiocyanate decomposition without introducing harmful additives, and to provide an economical and practical process which also would be conducive to improved stability against discoloration of, for example, spinning or "dope" solutions comprising a polymer of acrylonitrile dissolved in the recovered, concentrated aqueous thiocyanate solution.

It is a primary object of the present invention to provide an economical and practical method whereby a concentrated aqueous solution of a water-soluble thiocyanate can be recovered from a dilute solution thereof and especially such a solution having a pH of less than 7.0.

It is a further object of the invention to provide a process of the kind described above with minimum or no appreciable decomposition of the thiocyanate during concentration of the dilute thiocyanate solution to a more highly concentrated solution.

It is another object of the invention to provide a method of the type or kind aforementioned that is conducive to improved stability against discoloration of solutions comprising a polymer of acrylonitrile dissolved in a concentrated aqueous solution of a water-soluble thiocyanate which has been recovered from a dilute solution thereof.

Other objects of the invention will be apparent to those skilled in the art from the following more detailed description and the accompanying drawing of a flow sheet which illustrates a preferred method of the invention.

The concentrated aqueous solutions of water-soluble thiocyanates that are obtained or recovered in practicing my invention are solutions of those water-soluble, organic and inorganic thiocyanates which yield highly hydrated ions in an aqueous solution (e. g., guanidine thiocyanate and substituted thiocyanates such as are disclosed in the aforementioned Cresswell Patent No. 2,533,224; sodium thiocyanate and the other alkali-metal thiocyanates, calcium, strontium, barium, zinc, tin, lead and other water-soluble metallic thiocyanates; etc.). Of the solutions mentioned above, those wherein the thiocyanate is either sodium or calcium thiocyanate are more commonly employed in or adapted for commercial practice, and are those to which the present invention is especially applicable.

The dilute thiocyanate solutions which are generally processed in practicing my invention usually contain from about 2% to about 8 or 10% by weight of a thiocyanate, specifically sodium or calcium thiocyanate, on a net dry basis and have an acidic pH which may range, for example, from about 4 or 5 to 6.9. They also contain a dissolved iron compound, probably a thiocyanate complex of iron, which imparts objectionable color to the solution and hence should be removed if the recovered, concentrated solution is to be reused in making a polyacrylonitrile fiber or other shaped article, or for similar purposes. The dilute thiocyanate solution is generally a pale yellow in color, and is sometimes cloudy.

The problems mentioned hereinbefore in concentrating dilute thiocyanate solutions of the kind described in the preceding paragraph (including those which also contain a lower aliphatic monohydric alcohol, e. g., methyl or ethyl alcohol) have been solved as disclosed and claimed in this application. More particularly, it has been found that one can obtain a concentrated aqueous solution of a water-soluble thiocyanate from a dilute solution thereof having a pH of less than 7.0 by increasing the pH of the said dilute solution to at least 7.0, and preferably to a pH of at least about 7.5, and then concentrating the resulting solution to the desired concentration, for example, a concentration of about 57% to 58%, as by evaporation under heat, either by a batch process or by a semi-continuous or continuous process. The concentration of the solution may be effected either at atmospheric pressure or under a reduced pressure, as desired or as conditions may require.

In one embodiment of the invention the pH of the dilute solution of the water-soluble thiocyanate, e. g., sodium or other alkali-metal thiocyanate, and which is a by-product from the manufacture of synthetic fibers or other shaped articles in rod, film or other form, is increased to at least 7 and preferably to at least about 7.5 (e. g., a pH of from 7.5 to 8.5 or 9.0), after which it is filtered to remove solid suspended matter and is then concentrated to the desired concentration.

In accordance with another embodiment of the invention, there is added to the dilute thiocyanate solution a finely-divided adsorbent, more particularly a decolorizing agent, e. g., finely-divided activated carbon, bone black, certain natural or activated bleaching clays, etc., and also an alkaline material, e. g., sodium or potassium hydroxide, sodium or potassium carbonate, calcium hydroxide, ammonium hydroxide, etc., in an amount sufficient to increase the pH of the said solution to at least 7 and preferably to at least about 7.5, after which the solution is filtered to remove the suspended matter and then concentrated to the desired concentration. A filter aid, e. g., finely-divided diatomaceous earth, advantageously also is added to the dilute thiocyanate solution in order to facilitate filtration. Finely-divided activated carbon is preferably employed as the decolorizing agent and ammonium hydroxide as the alkaline material. One of the advantages of the latter is that by its use, and when a continuous evaporation or concentration process is employed, there is obtained a concentrated thiocyanate solution that requires little (sometimes not any) pH adjustment in order to meet the usual specifications for thiocyanate solution that is to be employed as a solvent for a polymer of acrylonitrile that is to be made into a fiber or other shaped article.

If it is desired to decolorize the dilute thiocyanate solution prior to concentration, or to decolorize the concentrated solution, it is not necessary that a finely-divided adsorbent or decolorizing agent be employed. For example, the same result can be accomplished by passing the neutral or, preferably, slightly alkaline solution through a bed or column of granular adsorbing or decolorizing material, e. g., granular bone black.

In accordance with another embodiment of the invention, the pH of the concentrated thiocyanate solution, either with or without (as desired or as conditions may require) a prior treatment with activated carbon or other decolorizing agent of the kind mentioned hereinbefore by way of example, is reduced (if not already at the desired acidic pH) to a pH below 7.0, generally a pH substantially below 7.0 and preferably to a pH ranging from about 6.0 to about 6.5. Any suitable means can be used for bringing the concentrated thiocyanate solution to the desired acidic pH, for instance by adding an acid or other acidic or acid-forming substance to the solution, or by passing the solution through a bed of a cationic exchange resin. If an acid be used it is preferred to employ acetic acid or some similar mild, relatively inexpensive acid having little or no tendency to corrode metal storage tanks or other apparatus with which the solution later may come in contact. Of course, the use of other organic acids (e. g., propionic, butyric, etc.) or of inorganic acids (e. g., sulfuric, phosphoric, hydrochloric, etc.) is not precluded, but it is generally desirable to avoid the latter because of their greater corrosive action on ordinary metal parts and which, if employed, may necessitate the use of more expensive, corrosion-resistant equipment. By adjusting the concentrated thiocyanate solution to an acidic pH, spinning and other solutions made therefrom and which contain, for example, a polymer of acrylonitrile, have better stability against discoloration during storage.

The flow sheet shown in the drawing accompanying this application illustrates the essential features of a preferred process of this invention and is amplified somewhat by the following more detailed description.

As shown in the flow sheet, the weak or dilute thiocyanate solution, e. g., a dilute solution of sodium thiocyanate, is collected in one of two storage tanks, and thence is passed to another tank wherein (a) a decolorizing agent, e. g., finely-divided activated carbon, (b) a filter aid, e. g., finely-divided diatomaceous earth and (c) an alkaline material, e. g., a weak (e. g., 2% or 3% by weight) solution of ammonium hydroxide, or a weak (e. g., 8% or 10% by weight) solution of sodium hydroxide are each added, usually continuously. The solution of thiocyanate and the aforementioned additives are agitated in this tank and then overflow to the second tank of the series. The alkaline additive causes ferric hydroxide to be precipitated, and this and the other suspended matter (including decolorizing agent and filter aid) are removed by filtering the solution through a suitable filter press. The filtered (clarified and decolorized) solution then passes to a storage tank and thereafter to a double-effect evaporator wherein the solution is concentrated under reduced pressure and at an elevated temperature to the desired concentration.

Backward feed is utilized in the double-effect evaporator, whereby the dilute feed enters the second effect which is heated by the distillate from the first effect. The feed to the two effects is controlled by indicating liquid-level controllers, while a recording density controller controls the discharge of concentrated thiocyanate solution to the tank indicated in the flow sheet. In this first receiving tank the concentrated thiocyanate solution is cooled, e. g., to 40° or 50° C., before being transferred to the second receiving tank as indicated.

The concentrated solution may be used in this form if it is not objectionably discolored or if color is not an important factor in the intended use, and if the concentrated solution is at the desired pH.

If the concentrated solution should require further treatment to improve its color, this may be done as indicated in the drawing, or by a series of decolorizing treatments. It is generally desirable that the color of the concentrated recovered solution be below APHA Color No. 20 [Standard Methods for the Examination of Water and Sewage, 9th edition, page 14 (1946), published by American Public Health Association, 1790 Broadway, New York 19, New York]. Likewise, if the solution requires adjustment to the preferred acidic pH, this also may be done as shown in the drawing, or as has been mentioned hereinbefore. One alternative procedure to that shown in the drawing involves simultaneous addition of the acidic additive and the decolorizing agent, with or without the addition of a filter aid (as desired or as conditions may require) in order to improve the filtration characteristics of the admixture. Another involves adjustment to the desired pH prior to the decolorizing treatment.

If the dilute thiocyanate solution to be processed contains any other valuable product to be recovered, e. g., methanol, ethanol or other lower aliphatic monohydric alcohol, this may be done at any suitable stage of the process. For instance, a volatile alcohol such as methanol or ethanol can be stripped off either prior to the treatment with the alkaline additive, or at a suitable stage thereafter, for example, after filtration and prior to passage of the dilute solution to the double-effect evaporator shown in the drawing.

Table I gives data on the results of certain laboratory tests and which show, among other things, how decomposition of the thiocyanate is avoided (as evidenced by the evolution or non-evolution of $H_2S$) by effecting the concentration of the dilute thiocyanate solution under non-acidic conditions, more particularly under alkaline conditions, and specifically by adjusting the dilute thiocyanate solution to a pH of 10 prior to concentration.

A two-liter distilling flask fitter with a water condenser, thermometer and water aspirator was used in this laboratory work. The charge was a 10% solution of NaSCN from a spinning bath reservoir. In runs 1 and 2 this solution was used without pH adjustment, that is, at its pH of 5.3 as received. In runs 3–5, the charge was adjusted to a pH of 10, and was treated with activated carbon as shown in the table. The dilute solution, with or without treatment as specified, was charged to the flask and concentrated to 57–58% by weight of NaSCN, as determined by boiling point and amount of distillate.

TABLE I

*Concentration of 10% NaSCN solution from spin bath reservoir*

| Run No. | 1 | 2 | 3 | 4 | 5 |
|---|---|---|---|---|---|
| Preparation of the charge: | | | | | |
| pH adjusted to ᵃ | 5.3 | 5.3 | 10 | 10 | 10. |
| Fe(OH)₃ filtered off | No | No | Yes | Yes | Yes. |
| Activated carbon treatment (one dose). | No | Yes | Yes | Yes | No. |
| Operating conditions: | | | | | |
| Pressure | 1 atm | 1 atm | 1 atm | 110 mm | 1 atm. |
| Maximum temperature. | 128 | 128 | 128 | 78 | 128. |
| Evolution of H₂S | Yes | Yes | No | No | No. |
| Treatment of the concentrate: | | | | | |
| No. of activated C doses. | 3 | 2 | 1 | 1 | 2. |
| Final pH | 5.3 | 5 | 9–10 | 10 | 8. |
| APHA color number. | Yellow | 11 | 15 | 19 | 17. |
| Iron, p. p. m. Fe | | 2 | 3 | 2 | |

ᵃ Runs 3, 4, 5. NaOH was used to adjust the pH of the charge. All activated carbon doses were 0.75% of NaSCN content.

Table II gives typical data with respect to the pH adjustment of the dilute feed of thiocyanate solution and of the concentrated product (aqueous solution of 57.5% ±0.2% by weight of NaSCN). In general, it was found that when the dilute thiocyanate solution was increased to a pH of about 7.5, the pH of the solution after concentration was lowered when the alkaline additive was ammonium hydroxide; and, also, the amount of acidic additive, e. g., acetic acid, if any, required for final pH adjustment also was reduced.

TABLE II

*pH adjustment of the dilute feed and of the concentrated product*

| pH of the dilute feed to evaporator (average) | Reagent | pH of the concentrate (average) | Glacial acetic acid added, cc./600 gal. concentrate (average) | Final pH (average) |
|---|---|---|---|---|
| 8.6 | 10% NaOH | 6.4 | 0 | 6.4 |
| 9.0 | 10% NaOH | 7.1 | 46 | 6.4 |
| 8.5 | 10% NaOH | 7.1 | 51 | 6.3 |
| 8.1 | 10% NaOH | 7.0 | 48 | 6.3 |
| 7.4 | 2% NH₄OH | 6.8 | 17 | 6.3 |
| | 2% NH₄OH | 6.8 | 16 | 6.2 |
| 7.6 | 2% NH₄OH | 6.3 | 2 | 6.2 |

I claim:

1. The method of obtaining a concentrated aqueous solution of an alkali-metal thiocyanate from a dilute aqueous solution containing from about 2% to about 10% by weight of the said thiocyanate and having a pH of less than 7.0, said method comprising adding to the said dilute solution, as the sole chemical additive, a substance which is alkaline in the said aqueous solution, the amount thereof being sufficient to increase the pH of the said dilute solution to at least 7.5 and concentrating the resulting solution by evaporation to an aqueous solution having a concentration of the said alkali-metal thiocyanate such that the said solution will dissolve a polymer of acrylonitrile.

2. The method of recovering a concentrated aqueous solution of an alkali-metal thiocyanate from a dilute solution containing from about 2% to about 10% by weight of the said thiocyanate and having a pH of less than 7.0 and which is a by-product from the manufacture of synthetic fibers, said method comprising adding to the said dilute solution, as the sole chemical additive, a substance which is alkaline in the said aqueous solution, the amount thereof being sufficient to increase the pH of the said dilute solution to at least about 7.5, filtering the dilute solution having a pH of at least about 7.5 to remove solid suspended matter, and concentrating the filtered solution by evaporation to an aqueous solution having a concentration of the said alkali-metal thiocyanate such that the said solution will dissolve a polymer of acrylonitrile.

3. A method as in claim 2 wherein the by-product, dilute solution of alkali-metal thiocyanate is a by-product, dilute solution of sodium thiocyanate.

4. A method as in claim 2 wherein the by-product, dilute solution of alkali-metal thiocyanate is treated with a decolorizing agent prior to concentration thereof by evaporation, said decolorizing agent being one which decolorizes by physical action.

5. The method of recovering a concentrated aqueous solution of sodium thiocyanate from a dilute aqueous solution containing from about 2% to about 10% by weight of the said thiocyanate and having a pH of less than 7.0 and which is a by-product from the manufacture of synthetic fibers, said method comprising adding to the said dilute solution a finely-divided decolorizing agent that decolorizes by physical action and, as the sole chemical additive, a substance which is alkaline in the said aqueous solution, the amount thereof being sufficient to increase the pH of the said dilute solution to at least about 7.5, filtering the resulting solution, and concentrating the filtered solution by evaporation to an aqueous solution having a concentration of the said sodium thiocyanate such that the said solution will dissolve a polymer of acrylonitrile.

6. A method as in claim 5 wherein the finely-divided decolorizing agent is finely-divided activated carbon.

7. A method as in claim 5 wherein the alkaline substance is ammonium hydroxide.

8. A method as in claim 5 wherein the finely-divided decolorizing agent is finely-divided activated carbon and the alkaline substance is ammonium hydroxide.

9. A method as in claim 5 wherein the filtered solution is concentrated until it contains about 57% to 58% by weight of sodium thiocyanate.

10. A method as in claim 5 which includes the additional step of adjusting the pH of the concentrated thiocyanate solution to a pH below 7.0.

11. A method as in claim 10 wherein the pH of the concentrated thiocyanate solution is adjusted to a pH ranging from about 6.0 to about 6.5.

12. A method as in claim 11 wherein the pH of the concentrated thiocyanate solution is adjusted with acetic acid to a pH ranging from about 6.0 to about 6.5.

13. A method as in claim 5 which includes the additional steps of decolorizing the concentrated thiocyanate solution and adjustment to a pH ranging from about 6.0 to about 6.5.

14. A method as in claim 13 wherein the concentrated thiocyanate solution is decolorized prior to adjustment to a pH ranging from about 6.0 to about 6.5, and said pH adjustment is effected by adding acetic acid to the decolorized solution.

15. The method of recovering, and preparing for reuse, a concentrated aqueous solution of sodium thiocyanate from a dilute solution thereof having a pH of less than 7.0, which contains from about 2% to about 8% by weight of sodium thiocyanate, and which is a byproduct from the manufacture of fibers comprised of a polymer of acrylonitrile, said method comprising adding to the said dilute solution (a) a finely-divided decolorizing agent comprising activated carbon, (b) a filter aid and (c) an alkaline material comprising ammonium hydroxide in an amount sufficient to increase the pH of the said dilute solution to about 7.5; agitating the solution containing the aforesaid ingredients of (a), (b) and (c); filtering the solution to remove the suspended matter; concentrating the filtered solution by evaporation until it contains about 57% to 58% by weight of sodium thiocyanate; decolorizing the resulting concentrated sodium thiocyanate solution with a decolorizing agent comprising activated carbon; and adding to the resulting decolorized thiocyanate solution an amount of acetic acid sufficient to bring it to a pH ranging from about 6.0 to about 6.5.

References Cited in the file of this patent

UNITED STATES PATENTS

| | | |
|---|---|---|
| 2,313,680 | Smith | Mar. 9, 1943 |
| 2,404,576 | Hill et al. | July 23, 1946 |
| 2,424,983 | Hill | Aug. 5, 1947 |
| 2,440,717 | Hill et al. | May 4, 1948 |

OTHER REFERENCES

Williams: Cyanogen Compounds, 1948, Edward Arnold and Co., p. 267.